United States Patent [19]
Scharnowski et al.

[11] Patent Number: 6,092,783
[45] Date of Patent: Jul. 25, 2000

[54] PRESSURE REGULATING VALVE WITH OPTIMIZED DEAERATION

[75] Inventors: Gerhard Scharnowski, Gehrden; Reinhard Mauentöbben, Hannover, both of Germany

[73] Assignee: Mannesmann AG, Düsseldorf, Germany

[21] Appl. No.: 09/268,963

[22] Filed: Mar. 16, 1999

[30] Foreign Application Priority Data

Mar. 16, 1998 [DE] Germany ............ 198 12 804

[51] Int. Cl.$^7$ ............................. F16K 31/02
[52] U.S. Cl. ............. 251/129.07; 137/102; 137/630.22
[58] Field of Search ............. 137/102, 596.17, 137/630.19, 630.22; 251/129.07

[56] References Cited

U.S. PATENT DOCUMENTS

| | | | |
|---|---|---|---|
| 3,873,063 | 3/1975 | Illing | 251/282 |
| 4,979,537 | 12/1990 | Offenwanger | 137/627.5 |
| 5,067,524 | 11/1991 | Pickenhahn | 137/627.5 |
| 5,918,856 | 7/1999 | Scharnowski et al. | 251/129.15 |

FOREIGN PATENT DOCUMENTS

| | | | |
|---|---|---|---|
| 25 22 677 | 12/1976 | Germany | H01F 7/16 |
| 31 44 521 | 7/1982 | Germany | F16K 31/06 |
| 40 28 506 | 3/1991 | Germany | F16K 31/02 |
| 91 07 562 | 6/1991 | Germany | F16K 31/02 |
| 42 20 479 | 1/1994 | Germany | F16K 31/06 |
| 44 29 373 | 2/1996 | Germany | F15B 13/044 |

OTHER PUBLICATIONS

"Know–how in Pneumatik" by Mannesmann Rexroth Pneumatik GmbH, Nov. 1993.

*Primary Examiner*—Gregory L. Huson
*Assistant Examiner*—R. Krishnamurthy
*Attorney, Agent, or Firm*—Cohen, Pontani, Lieberman & Pavane

[57] ABSTRACT

An electropneumatic pressure regulating valve has an electromagnet fastened, as an actuating drive, to a valve housing. At least one work connection and a deaeration connection in the valve housing are guided, respectively, to a work chamber and deaeration chamber arranged inside the valve housing. The work chamber and the deaeration chamber are separated from one another by a valve seat corresponding to a valve tappet as closing element. The valve tappet proceeds from the electromagnet and is movable longitudinally through the work chamber via a movable magnet armature of the electromagnet. To improve the deaeration behavior and to achieve a more precise control capability during deaeration, the valve tappet has a through-hole which is directed longitudinally proceeding from its lower disk face and which opens into a pressure-tight coil interior space within the electromagnet. The coil interior space is sealed against the work chamber by a seal which enables the longitudinal movability of the valve tappet.

10 Claims, 2 Drawing Sheets

PRESSURE REGULATING VALVE WITH OPTIMIZED DEAERATION

BACKGROUND OF THE INVENTION

1. Field of the Invention

The invention is directed to an electropneumatic pressure regulating valve having a work chamber and a deaeration chamber separated by a valve seat and a tappet movably guided to and from said valve seat through the work chamber by an electromagnet.

2. Description of the Related Art

A prior art electropneumatic pressure regulating valve is known, for example, from the product catalog "Know-how in Pneumatik" by Mannesmann Rexroth Pneumatik GmbH (11/93, pages 7.026f). This prior art pressure regulating valve controls a pressure corresponding to a predetermined reference value. Integrated regulator electronics compare a reference value to a pressure measured as actual value in a work line by a pressure sensor. The regulator electronics generate a controlling variable therefrom which is supplied to a proportional magnet constructed as an electromagnet, so that this proportional magnet adjusts the predetermined pressure value in the work line by actuating an integrated lift seat-type valve arrangement. The lift valve arrangement is substantially formed of a valve tappet which cooperates with a valve seat and has, for this purpose, a disk face at its end. The valve tappet is guided through a work chamber and is connected at its other end to a magnet armature which is movable longitudinally in the electromagnet.

The pressure regulating valve also has a deaeration connection and a supply pressure connection to perform the task for which it is intended, in addition to a work connection connected with the work chamber. If the pressure in the work line is to be increased corresponding to the controlling variable put out by the regulator electronics, the work connection is connected with the supply connection via the internal seat valve arrangement by the electromagnet until the predetermined higher pressure has been adjusted in the work line. Similarly, if the pressure in the work line is to be decreased, the work connection is connected in a corresponding manner with the deaeration connection until the predetermined lower pressure has been adjusted in the work line.

During the deaeration process mentioned above, an impact pressure dependent on the deaeration lift acts on a lower disk face of the valve tappet corresponding to the valve seat. As a result, the necessary actuation force of the electromagnet acting in the opposite direction increases and reaches its maximum at the greatest deaeration lift. This phenomenon which is known in investigations of the deaeration behavior of valves of this type hinders the capability for precise control of the valve due the change in actuation force by way of the deaeration lift. The unstable states which occur as a result, particularly in a pressure regulating valve, result in a poor ability overall to regulate the pressure in the work line.

SUMMARY OF THE INVENTION

Therefore, it is the object of the invention to improve the deaeration behavior of a pressure regulating valve and to achieve the capability of a more precise control of the valve during deaeration.

This object is met by a pressure regulating valve having a valve tappet with a through-hole connecting a lower disk face of the tappet with a pressure tight coil space inside an electromagnet which moves the tappet through a work space of the valve. The coil interior space is sealed against the work space by a seal which allows movement of the valve tappet.

As a result of this configuration, the impact pressure occurring under the disk face of the valve tappet during the deaeration also travels into the coil interior space and causes a counter-force in the latter on the end of the coil side of the valve tappet opposing the impact pressure acting on the disk face of the valve tappet. This results in a pressure-compensated state in the form of an equilibrium of forces brought about by the diverted impact pressure according to the invention. Therefore, the impact pressure present at the disk face of the valve tappet during deaeration no longer influences the actuation force of the valve tappet and accordingly no longer influences the regulating behavior of the valve. This ensures that the valve can be controlled in a highly precise manner during the deaeration process.

In an further embodiment of the invention, the dynamic seal is constructed as a groove ring or an O-ring. This represents an optimum solution in terms of cost. To improve the sliding characteristics, the groove ring or O-ring may contact a running surface on the tappet made of Teflon. Further, the dynamic seal may also be constructed as a flat diaphragm or a rolling diaphragm. When the required lift paths of the valve tappet are smaller, a flat diaphragm is recommended. When greater lift paths of the valve tappet are required, a rolling diaphragm may be used. The use of diaphragms as sealing means completely eliminates friction of the valve tappet at the seal counterpart, which has a positive effect on the dynamic behavior of the valve.

In another embodiment, the cylindrical coil interior space is enclosed by a pole pipe which is closed against the atmosphere so as to be tight against pressure by a front closing cap which enables at least one internal magnet armature to be mounted. The closing cap is preferably connected with the pole pipe by a crimp connection and a seal arranged therebetween. This obviates the need for a breathing bore hole connecting the coil interior space with the atmosphere which was previously required and which otherwise compensates for a pressure difference between the coil interior space and the atmosphere caused by the longitudinal movement of the magnet armature. Furthermore, the protection of the valve from external influences such, for example, as sprayed water is improved by eliminating the breathing bore hole.

The above-mentioned invention may be applied not only in pressure regulating valves, but also in all seat valves of the type mentioned above in which the valve tappet is guided toward the valve seat through the work chamber proceeding from the movable magnet armature of the electromagnet. This design arrangement results in the above-described configuration of forces between the actuation force and the force generated by the impact pressure occurring at the lower disk face.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters are used to denote similar elements.

DETAILED DESCRIPTION OF THE PRESENTLY PREFERRED EMBODIMENTS

Figure 1:
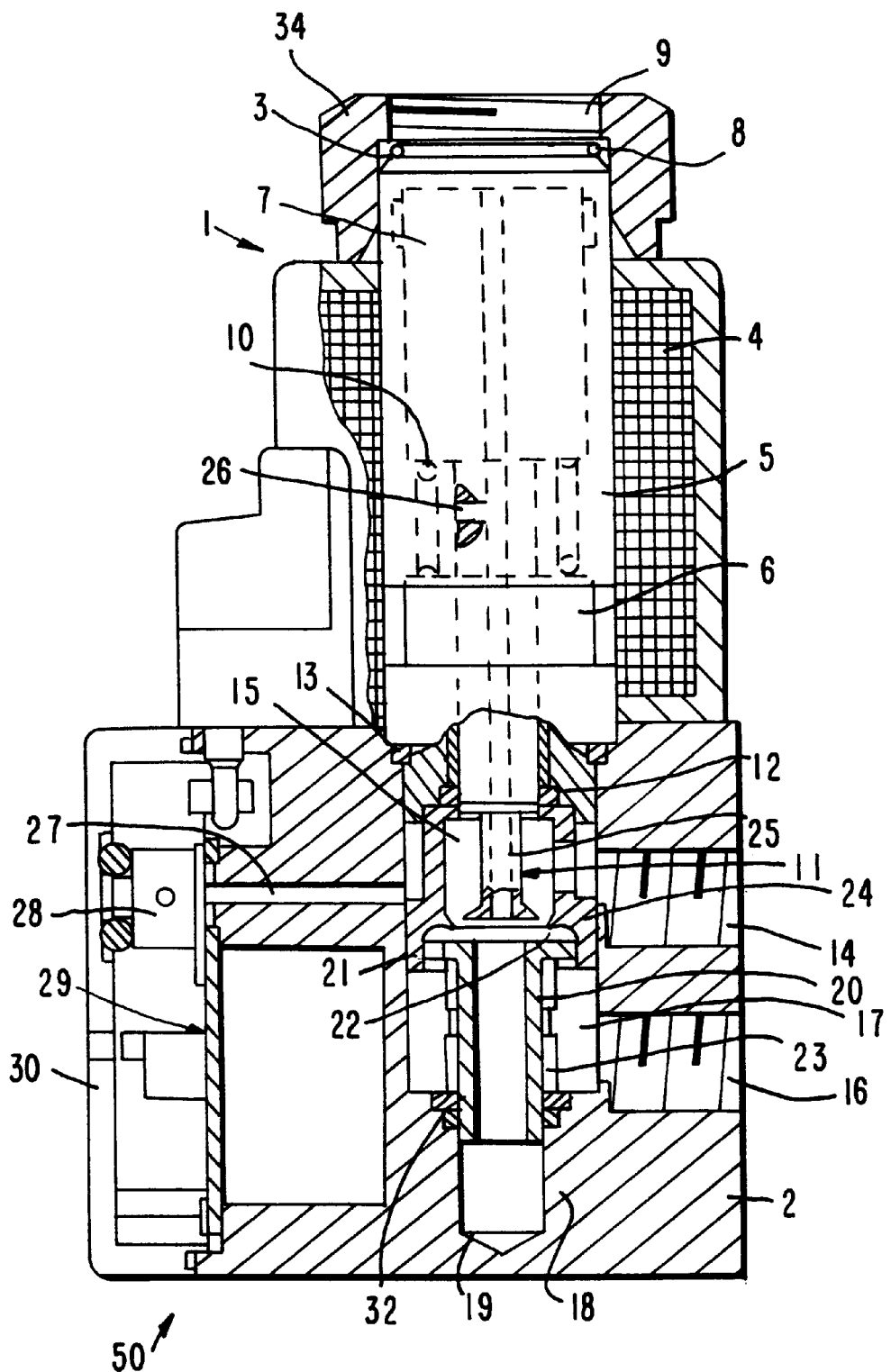
FIG. 1 shows a partial longitudinal section through an electropneumatic pressure regulating valve according to an embodiment of the invention.

An electropneumatic pressure regulating valve 50 according to an embodiment of the present invention is shown in FIG. 1 and includes an electromagnet 1 constructed as a proportional magnet. The electromagnet 1 is removably fastened to a valve housing 2 by a removable fastening such as a screw connection or pin connection that is not shown. The electromagnet 1 has an electric coil 4 that encloses a pole pipe 3 and is fastened to the pole pipe 3 by a front nut 34. A side of the electric coil 4 opposite the front nut 34 contacts the valve housing 2. A cylindrical interior space 5 of the electric coil 4 formed inside the pole pipe 3 receives a stationary magnet armature 6 and a movable magnet armature 7 which is movable longitudinally in the interior space 5 of the electric coil 4. The cylindrical interior space 5 is closed in a pressure-tight manner at one end by a closing cap 9 that includes a seal 8. The closing cap 9 has an outer diameter which engages an inner diameter of the pole pipe 3 which is correspondingly constructed. A nondetachable connection between the closing cap 9 and the pole pipe 3 is created by crimping an outer circumference of the pole pipe 3 in the area in which the closing cap is engaged. The nondetachable connection prevents removal of the interior movable magnet armature 7. As an alternative, a screw connection may also be provided at this location to create the detachable connection.

The movable magnet armature 7 is held in an upper initial position in the currentless state of the electric coil 4 by a pressure spring 10 arranged between the movable magnet armature 7 and the stationary magnet armature 6. A valve tappet 11 connected to and proceeding coaxially from the movable magnet armature 7 projects into the interior of the valve housing 2 via a bore hole in the stationary magnet armature 6. A seal 12 is arranged between the stationary magnet armature 6 and the valve tappet 11 to seal the interior space 5 of the coil relative to the interior of the valve housing 2. The seal 12 is recessed in a groove in the stationary magnet armature 6 and enables the longitudinal movement of the valve tappet 11. A second seal 13 is arranged between the stationary magnet armature 6 and the valve housing 2 for sealing the interior of the valve housing 2 against the atmosphere.

The valve housing 2 includes a work connection 14 which leads to an internal work chamber 15, a supply pressure connection 16 which leads to a corresponding supply pressure chamber 17, and a deaeration connection 18 with associated deaeration chamber 19. The electropneumatic pressure regulating valve 50 has a deaeration position, a zero position and an aeration position and is, accordingly, a 3/3-way directional control valve. The pressure regulating valve 50 has a movably mounted valve seat sleeve 20 for aerating and deaerating the work chamber 15. An aeration valve seat in the form of a valve seat ring 21 is inserted in a pressure-tight manner in the valve housing in the area of a front portion of the valve seat sleeve 20 (the front portion faces the valve tappet 11). A sealing ring 22 is arranged at the front side of the valve seat sleeve 20. The sealing ring 22 acts as a closing element for the valve seat ring 21. The end of the valve seat sleeve 20 located opposite from the valve seat ring 21 is held in the valve housing 2 so that the valve seat sleeve 20 is guided for movement along its longitudinal axis within the valve housing for opening and closing the seal between the sealing ring 22 and the valve seat ring 21. A seal 32 is inserted between the guide area of the valve seat sleeve 20 and the valve housing 2. The seal 32 separates the supply pressure chamber 17 from the deaeration chamber 19 so as to be tight against pressure and so that no pressure medium can escape into the atmosphere from the supply pressure chamber 17. The valve seat sleeve 20 is held in an initial position such that the sealing ring 22 contacts the valve seat ring 21 by a pressure spring 23 which is arranged between the valve housing 2 and a portion of the valve seat sleeve 20 facing away from the valve seat ring 21.

To enable an aeration of the valve that is free from the influences of pressure, i.e., in order to prevent interference forces caused thereby, the valve seat sleeve 20 is arranged, according to the condition for pressure-compensated tappets, in such a way that the diameter at the guide of the valve seat sleeve 20 is identical to the diameter of the valve seat ring 21 and is identical to the diameter of the seal 12 at the valve tappet 11 of the electromagnet 1.

To enable a deaeration of the valve which is free from impact pressure forces forming below a disk face 24 of the valve tappet 11, the valve tappet 11 has a longitudinally directed through-hole 25 proceeding from the lower disk face 24 and opening into the pressure-tight interior space 5 of the coil within the electromagnet 1. A channel 26 branches off from the through-hole 25 below the movable magnet armature 7 for connecting the interior space 5 of the coil 14 for providing a uniform flow within the interior space 5 of the coil. In its aeration position, the movable magnet armature 7 of the electromagnet 1 urges the valve tappet 11 against the valve seat sleeve 20 and moves the valve seat sleeve 20 away from the valve seat ring 21 via the valve tappet 11. In this aeration position, pressure medium coming from the supply pressure connection 16 flows via the supply pressure chamber 17 to the valve seat ring 21 serving as aeration valve seat, into the work chamber 15 and out of the valve housing 2 through the work connection 14 for increasing the pressure in the work connection 14.

In the deaeration position which is the position shown in FIG. 1, the movable magnet armature 7 is moved back upward and the sealing ring 22 contacts the valve seat ring 21 through the valve seat sleeve 20 which is urged upward by the pressure spring 23. The valve tappet 11 is lifted from the sealing ring 22. Accordingly, pressure medium coming from the work connection 14 passes through the interior of the valve seat sleeve 20 via the work chamber 15 to the deaeration chamber 19 and finally to the deaeration connection 18 which need not necessarily be outfitted with a pressure medium line, but rather may also proceed directly—via an optional noise damper—to the atmosphere. Simultaneously, the pressure medium flows through the through-hole 25 of the valve tappet 11 into the interior space 5 of the coil to form a force opposed to the impact pressure occurring on the disk face 24.

In the zero position of the regulating valve 50, the movable magnet armature 7 is in a middle position such that both the valve seat ring 21 and the valve seat sleeve 22 are closed and so that there is no aeration or deaeration of the work chamber 15.

A pressure channel 27 in the valve housing 2 operatively connects the work chamber 15 to a pressure sensor 28 of regulator electronics 29 which are integrated in the valve housing 2. The regulator electronics 29 are accessible via a removable cover 30 at the valve housing 2. The electric output signal of the pressure sensor 28 is available to the regulator electronics 29 as an actual value. The regulator electronics 29 also receives a reference value supplied by a master control unit, not shown. The regulator electronics 29 control the electromagnet 1 such that a pressure corresponding to the reference value is adjusted in the work chamber 15 by aerating or deaerating the work chamber 15.

Figure 2:
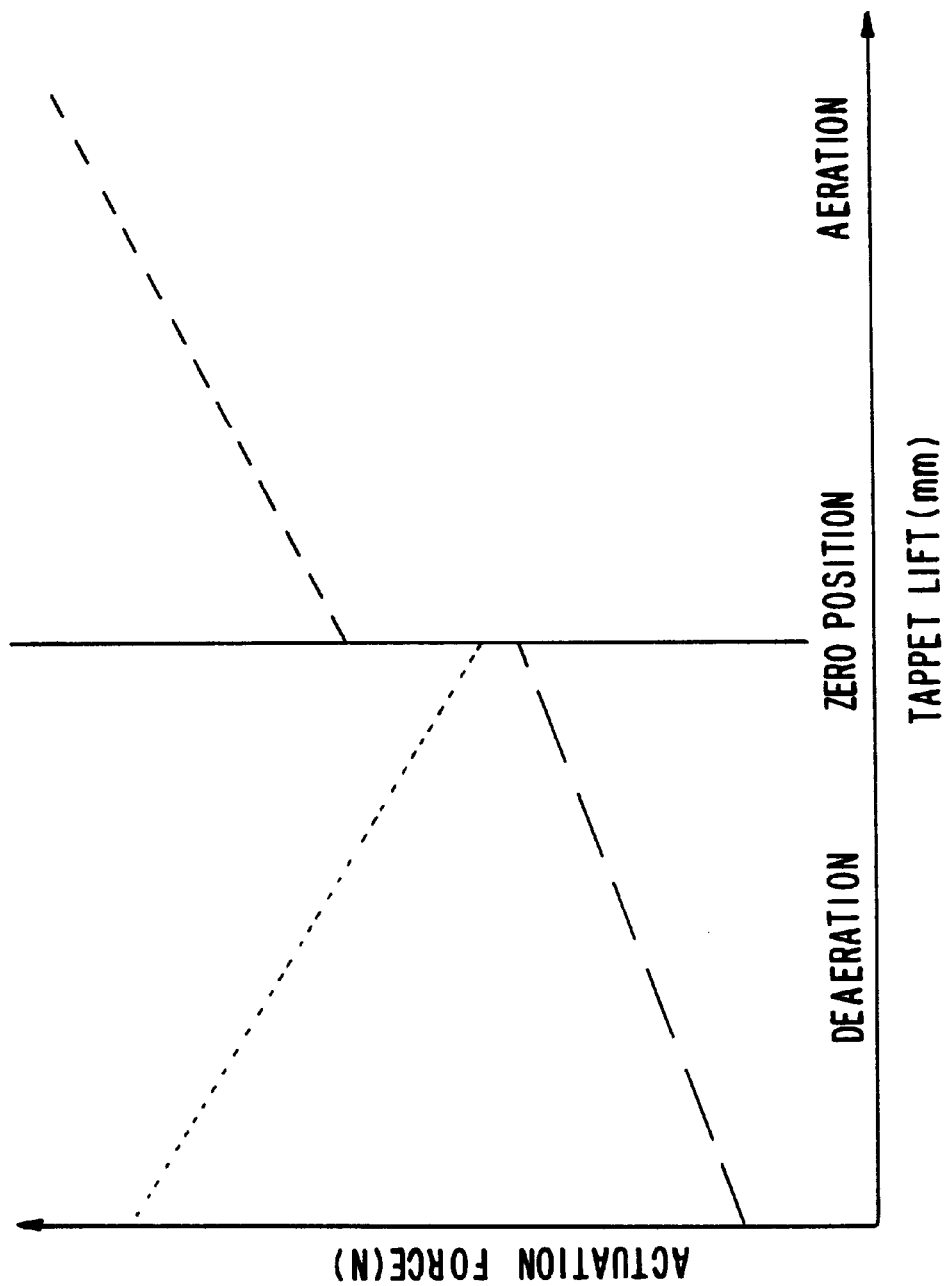
FIG. 2 is a graph showing an actuation force—lift characteristic of the pressure regulating valve according to FIG. 1.

The graph in FIG. 2 shows the average required actuation force value generated by the electromagnet 1 for every lift value of the valve tappet 11. Accordingly, only small actuation forces (dashed line) are required for the valve tappet 11 for the lift value interval of deaeration. This phenomenon is based on the elimination, according to the invention, of the interference force occurring as a result of the impact pressure below the disk face 24 of the valve tappet 11. In this respect, the pressure regulating valve can be precisely regulated especially in the deaeration range. Compared to the latter, the graph (dotted line) also shows the actuation force curve which would be required without the steps according to the invention for eliminating the interference force occurring due to the impact pressure at the disk face 24. In this case, a much higher actuation force is required in order to move the valve tappet 11.

The required actuation force increases abruptly in the zero position of the valve for the lift values interval of aeration. In this case, the actuation forces required for pressure compensation are still considerably higher than those required during deaeration in spite of the steps described above.

As a result, the invention ensures a more precise controllability of the tappet 11 by means of the electromagnet 1 for a valve used for purposes of deaeration—especially also for deaeration in an electropneumatic pressure regulating valve—and in this respect improves the deaeration behavior of the valve.

The invention is not limited by the embodiments described above which are presented as examples only but can be modified in various ways within the scope of protection defined by the appended patent claims.

We claim:

1. An electropneumatic pressure regulating valve, comprising:

a valve housing having a work chamber with a work connection and a deaeration chamber with a deaeration connection;

a valve seat operatively connected in said valve housing between said work chamber and said deaeration chamber;

an electromagnet comprising a movable armature and a valve tappet having a disk face connected to said movable armature for moving longitudinally through said work chamber to and from a closed position, said disk face of said valve tappet contacts said valve seat and closes a connection between said work chamber and said deaeration chamber when said tappet is in said closed position;

said valve tappet having a through hole connecting a bottom of said disk face with a pressure tight coil space within said electromagnet; and a dynamic seal for sealing said coil space from said work chamber while simultaneously permitting movement of said tappet.

2. The valve of claim 1, wherein said dynamic seal comprises one of a groove ring and an O-ring.

3. The valve of claim 2, wherein said tappet comprises a running surface of Teflon which contacts said dynamic seal for facilitating sliding characteristics of said tappet.

4. The valve of claim 1, wherein said dynamic seal comprises one of a flat diaphragm seal and a rolling diaphragm seal.

5. The valve of claim 1, further comprising a pole pipe inserted in said electromagnet and a front closing cap closing a front end of said pole pipe against pressure, wherein said pressure-tight coil space of said coil is enclosed by said pole pipe and said front closing cap and said movable magnet armature is mounted in said pole pipe.

6. The valve of claim 5, wherein a connection between said closing cap and said pole pipe comprises a crimp connection with a seal arranged between said closing cap and said pole pipe.

7. The valve of claim 5, wherein a connection between said closing cap and said pole pipe comprises a screw connection with a seal arranged between said closing cap and said pole pipe.

8. The valve of claim 1, wherein said electromagnet comprises a proportional magnet.

9. The valve of claim 1, wherein said valve housing further comprises a supply pressure connection opening into a supply pressure chamber in said valve housing, said valve seat comprises a valve seat sleeve actuatable by said valve tappet, and said supply pressure chamber being separated from said work chamber via said valve seat sleeve.

10. The valve of claim 1, further comprising a pressure sensor integratably mountable in said valve housing for detecting a pressure in said work chamber via a pressure channel and outputting an output signal in response to said pressure in said work chamber, regulator electronics signally connected to said pressure sensor for receiving said output signal and connectable to a master control unit for receiving a reference value, said regulator electronics connected to said electromagnet for controlling said electromagnet such that a pressure value corresponding to said reference value is adjusted in said work chamber by aeration or deaeration of said work chamber.

* * * * *